US011353058B2

(12) United States Patent
Morimoto et al.

(10) Patent No.: US 11,353,058 B2
(45) Date of Patent: Jun. 7, 2022

(54) PULLEY STRUCTURE, SLIDING BEARING, AND PRODUCTION METHOD FOR SLIDING BEARING

(71) Applicant: Mitsuboshi Belting Ltd., Kobe (JP)

(72) Inventors: Takashi Morimoto, Hyogo (JP); Hayato Shimamura, Hyogo (JP); Katsuya Imai, Hyogo (JP); Ryosuke Dan, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 15 days.

(21) Appl. No.: 17/254,691

(22) PCT Filed: Jun. 25, 2019

(86) PCT No.: PCT/JP2019/025191
§ 371 (c)(1),
(2) Date: Dec. 21, 2020

(87) PCT Pub. No.: WO2020/004397
PCT Pub. Date: Jan. 2, 2020

(65) Prior Publication Data
US 2021/0180648 A1    Jun. 17, 2021

(30) Foreign Application Priority Data

Jun. 25, 2018  (JP) .............................. JP2018-119639
Jun. 17, 2019  (JP) .............................. JP2019-111677

(51) Int. Cl.
*F16C 21/00* (2006.01)
(52) U.S. Cl.
CPC .......... *F16C 21/00* (2013.01); *F16C 2361/63* (2013.01)

(58) Field of Classification Search
CPC .......... F16C 17/02; F16C 19/06; F16C 21/00; F16C 2361/63; F16H 55/36
See application file for complete search history.

(56) References Cited

U.S. PATENT DOCUMENTS 9,458,885 B2    10/2016  Ishii et al.
9,982,768 B2 *   5/2018  Hartnett ................ F16C 13/006
(Continued)

FOREIGN PATENT DOCUMENTS

DE    102016209598 A1    12/2017
EP        2998196 A1     3/2016
(Continued)

OTHER PUBLICATIONS

Sep. 17, 2019—International Search Report—Intl App PCT/JP2019/025191.
(Continued)

*Primary Examiner* — Phillip A Johnson
(74) *Attorney, Agent, or Firm* — Banner & Witcoff, Ltd.

(57) ABSTRACT

A pulley structure includes a cylindrical outer rotation body, an inner rotation body, and a pair of bearings which is disposed between the outer rotation body and the inner rotation body. Of the pair of bearings, one bearing is a sliding bearing, and the other bearing is a rolling bearing. The sliding bearing is made of a thermoplastic resin and is formed into an ended ring shape. A thickness of the sliding bearing at each of both circumferential end portions is smaller than a reference dimension of a thickness of the sliding bearing.

6 Claims, 6 Drawing Sheets

(56) References Cited

U.S. PATENT DOCUMENTS

| | | | | |
|---|---|---|---|---|
| 2013/0217524 A1* | 8/2013 | Antchak | ................. | F16H 55/36 |
| | | | | 474/94 |
| 2015/0184703 A1 | 7/2015 | Shimamura et al. | | |
| 2016/0061256 A1 | 3/2016 | Nakagawa et al. | | |
| 2017/0254366 A1 | 9/2017 | Antchak et al. | | |
| 2018/0328414 A1* | 11/2018 | Kastner | ................. | F16D 41/206 |
| 2020/0166084 A1 | 5/2020 | Antchak et al. | | |

FOREIGN PATENT DOCUMENTS

| | | | |
|---|---|---|---|
| JP | 2014-114947 A | 6/2014 | |
| JP | 2014-223817 A | 12/2014 | |
| JP | 2017-526881 A | 9/2017 | |
| JP | 2018-017277 A | 2/2018 | |
| WO | WO-2009118834 A1 * | 10/2009 | ........... F02N 15/023 |
| WO | 2016-133148 A1 | 8/2016 | |

OTHER PUBLICATIONS

Oct. 13, 2021—(ID) Substantive Examination Report—App P00202009853.
Feb. 15, 2022—(CA) Office Action—App 3,103,156.
Feb. 21, 2022—(EP) Extended Search Report—App 19825781.8.

\* cited by examiner

PULLEY STRUCTURE, SLIDING BEARING, AND PRODUCTION METHOD FOR SLIDING BEARING

CROSS REFERENCE TO RELATED APPLICATIONS

This is a U.S. National Phase Application under 35 U.S.C. § 371 of International Application No. PCT/JP2019/025191, filed Jun. 25, 2019, which claims priority to Japanese Application Nos. 2018-119639, filed Jun. 25, 2018, and 2019-111677, filed Jun. 17, 2019, which was published Under PCT Article 21(2), the entire contents of which are incorporated herein by reference.

TECHNICAL FIELD

The present invention relates to a pulley structure, a sliding bearing constituting the pulley structure, and a method for producing a sliding bearing constituting the pulley structure.

BACKGROUND ART

A pulley structure described in Patent Literature 1 includes an outer rotation body, an inner rotation body, and a pair of bearings. The outer rotation body is a cylindrical member around which a belt is wound and which is rotated around a predetermined rotation axis by a torque applied from the belt. The inner rotation body is provided radially inward of the outer rotation body, and is rotatable with respect to the outer rotation body around the rotation axis. The pair of bearings is disposed between the outer rotation body and the inner rotation body at each of one end side and the other end side in an axial direction along the rotation axis, and connects the outer rotation body and the inner rotation body to make the rotation bodies rotatable with respect to each other. One of the pair of bearings is a sliding bearing, and the other bearing is a rolling bearing.

CITATION LIST

Patent Literature

Patent Literature 1: JP-A-2014-114947

SUMMARY OF INVENTION

Technical Problem

In the pulley structure as described in Patent Literature 1, a sliding bearing formed in an ended ring shape may be used as the sliding bearing. The term "ended ring shape" means a ring shape having a substantially C shape in which both ends in a circumferential direction are not connected to each other. From the viewpoint of low friction slidability and wear resistance, the sliding bearing may be made of a hard thermoplastic resin such as a polyacetal resin or a polyamide resin. In this case, for example, it is conceivable to produce the sliding bearing by an injection molding method of injection-filling, using an injection molding machine equipped with a mold having a cavity with an ended ring shape, a thermoplasticized (heat-melted) resin composition into the cavity, and then cooling and solidifying the resin composition. When the sliding bearing is produced by such an injection molding method, a plurality of sliding bearings can be produced at once by one injection operation.

As described above, in the case of producing the sliding bearing having an ended ring shape by the injection molding method, when injection-filling the plasticized (heat-melted) resin composition into the cavity with an ended ring shape, a filling pressure (internal pressure) at each of both circumferential end portions (end portions in a resin flow direction) of the cavity is slightly higher than a filling pressure (internal pressure) at a portion of the cavity other than the both circumferential end portions. Therefore, both circumferential end portions of the sliding bearing each have a slightly smaller molding shrinkage than a portion other than the both circumferential end portions (strictly speaking, molding shrinkage is smaller toward the end in the circumferential direction). As a result, when a radial width of the cavity (a length corresponding to a thickness of the sliding bearing) is constant regardless of the position at the cavity in the circumferential direction, in the prepared sliding bearing, the thickness of each of the both circumferential end portions is slightly larger than the thickness of the portion other than the both circumferential end portions.

On the other hand, in the pulley structure as described in Patent Literature 1, the sliding bearing is, for example, in a state where an inner circumferential surface thereof is in close contact with the inner rotation body in a state where a diameter thereof is slightly increased. In this case, when the outer rotation body and the inner rotation body rotate with respective to each other, the sliding bearing and the outer rotation body mainly slide, and a gap (hereinafter referred to as "sliding gap") having a reference dimension of about 0.1 mm is formed between the sliding bearing and the outer rotation body. Then, when the belt is wound around the outer rotation body of the pulley structure, a portion of the outer rotation body to which the force from the belt is applied is pressed toward the sliding bearing. Therefore, in the portion of the outer rotation body to which the force from the belt is applied, the sliding gap becomes narrow and becomes almost zero. At this time, with respect to the rotation axis of the outer rotation body, the sliding gap is widened (for example, about 0.2 mm) in a portion to which the force from the belt is not applied and which is on the opposite side of the portion of the outer rotation body to which the force from the belt is applied.

In this case, as described above, when ended ring the diameter of each of the both circumferential end portions is larger than the diameter of the portion other than the both circumferential end portions in the sliding bearing having an ended ring shape, every time (periodically) the both circumferential end portions of the sliding bearing reach a position facing the portion of the outer rotation body to which the force from the belt is applied, the sliding bearing applies a force to the outer rotation body to a radial outer side so as to widen the gap between the outer rotation body and the inner rotation body. Accordingly, the outer rotation body may vibrate and abnormal noise may be generated.

An object of the present invention is to provide a pulley structure, a sliding bearing constituting the pulley structure, and a method for producing the sliding bearing constituting the pulley structure, which can prevent the generation of abnormal noise caused by vibration of the outer rotation body or the inner rotation body due to a force applied from the sliding bearing.

Solution to Problem

A pulley structure according to a first aspect of the present invention includes: a cylindrical outer rotation body around which a belt is to be wound and which is rotated around a rotation axis by a torque applied from the belt; an inner rotation body which is provided radially inward of the outer rotation body, and is relatively rotatable with respect to the outer rotation body around the rotation axis; and a pair of bearings which is disposed between the outer rotation body and the inner rotation body at each of one end side and the other end side in an axial direction along the rotation axis, and connects the outer rotation body and the inner rotation body to make the rotation bodies rotatable with respect to each other, in which of the pair of bearings, one bearing is a sliding bearing, and the other bearing is a rolling bearing, the sliding bearing is made of a thermoplastic resin and is formed into an ended ring shape, and a thickness of the sliding bearing at each of both circumferential end portions is smaller than a reference dimension of a thickness of the sliding bearing. That is, the sliding bearing has both circumferential end portions each having a thickness smaller than the reference dimension of the thickness of the sliding bearing.

According to this configuration, since the thickness of each of the both circumferential end portions of the sliding bearing made of a thermoplastic resin and formed into an ended ring shape is smaller than the reference dimension of the thickness of the sliding bearing, it is possible to prevent generation of abnormal noise caused by vibration of the outer rotation body or the inner rotation body when a force is periodically applied from the sliding bearing to the outer rotation body or the inner rotation body to widen a gap between the outer rotation body and the inner rotation body.

A pulley structure according to a second aspect of the present invention is the pulley structure according to the first aspect, in which an inner circumferential surface of the sliding bearing is in contact with the inner rotation body in a state where a diameter thereof is increased so that the sliding bearing is in close contact with the inner rotation body due to a self-elastic restoring force in a diameter decreasing direction, a diameter of the inner circumferential surface of the sliding bearing is constant over an entire circumference in a circumferential direction, and outer circumferential surfaces of the both circumferential end portions of the sliding bearing form chamfered portions extending to a radial inner side as approaching respective ends in the circumferential direction.

According to this configuration, the thickness of the sliding bearing at each of the both circumferential end portions is made smaller than the thickness of the sliding bearing at a portion other than the both circumferential end portions, and contact between the inner circumferential surface of the sliding bearing and the inner rotation body can be improved.

A sliding bearing according to a third aspect of the present invention is a sliding bearing constituting a pulley structure, the pulley structure including a cylindrical outer rotation body around which a belt is to be wound and which is rotated around a rotation axis by a torque applied from the belt, an inner rotation body which is provided radially inward of the outer rotation body, and is relatively rotatable with respect to the outer rotation body around the rotation axis, and a pair of bearings which is disposed between the outer rotation body and the inner rotation body at each of one end side and the other end side in an axial direction along the rotation axis, and connects the outer rotation body and the inner rotation body to make the rotation bodies rotatable with respect to each other, in which, of the pair of bearings, one bearing is the sliding bearing, and the other bearing is a rolling bearing, in which the sliding bearing is made of a thermoplastic resin, the sliding bearing is formed into an ended ring shape, and a thickness at each of both circumferential end portions of the sliding bearing is smaller than a reference dimension of a thickness of the sliding bearing. That is, the sliding bearing has both circumferential end portions each having a thickness smaller than the reference dimension of the thickness of the sliding bearing.

According to this configuration, since the thickness of each of the both circumferential end portions of the sliding bearing made of a thermoplastic resin and formed into an ended ring shape is smaller than the reference dimension of the thickness of the sliding bearing, it is possible to prevent generation of abnormal noise caused by vibration of the outer rotation body or the inner rotation body when a force is periodically applied from the sliding bearing to the outer rotation body or the inner rotation body to widen a gap between the outer rotation body and the inner rotation body.

A sliding bearing according to a fourth aspect of the present invention is the sliding bearing according to the third aspect, wherein an inner circumferential surface of the sliding bearing is in contact with the inner rotation body in a state where a diameter of the sliding bearing is increased so that the sliding bearing is in close contact with the inner rotation body due to a self-elastic restoring force in a diameter decreasing direction, a diameter of the inner circumferential surface is constant over an entire circumference in a circumferential direction, and outer circumferential surfaces of the both circumferential end portions form chamfered portions extending to a radial inner side as approaching respective ends in the circumferential direction.

According to this configuration, the thickness of the sliding bearing at each of the both circumferential end portions is made smaller than the thickness of the sliding bearing at a portion other than the both circumferential end portions, and contact between the inner circumferential surface of the sliding bearing and the inner rotation body can be improved.

A method for producing a sliding bearing according to a fifth aspect of the present invention is a method for producing a sliding bearing constituting a pulley structure, the pulley structure including a cylindrical outer rotation body around which a belt is to be wound and which is rotated around a rotation axis by a torque applied from the belt, an inner rotation body which is provided radially inward of the outer rotation body, and is relatively rotatable with respect to the outer rotation body around the rotation axis, and a pair of bearings which is disposed between the outer rotation body and the inner rotation body at each of one end side and the other end side in an axial direction along the rotation axis, and connects the outer rotation body and the inner rotation body to make the rotation bodies rotatable with respect to each other, in which, of the pair of bearings, one bearing is the sliding bearing having an ended ring shape, and the other one bearing is a rolling bearing, the method including: injection-molding a thermoplastic resin by using a mold having a cavity with an ended ring shape, to prepare the sliding bearing, in which a radial width of the cavity at each of both circumferential end portions is smaller than a reference dimension of a radial width of the cavity. That is, the cavity has both circumferential end portions each having a width smaller than the reference dimension of the radial width of the cavity.

According to this configuration, it is possible to produce a sliding bearing which is made of a thermoplastic resin, formed into an ended ring shape, and has a thickness at each of the both circumferential end portions smaller than the reference dimension of the thickness of the sliding bearing.

A method for producing a sliding bearing according to a sixth aspect of the present invention is the method for producing a sliding bearing according to the fifth aspect, in which a diameter of a wall surface on a radial inner side of the cavity is constant over an entire circumference in the circumferential direction, and in the both circumferential end portions of the cavity, wall surfaces on a radial outer side of the cavity extend to the radial inner side as approaching respective ends in the circumferential direction.

According to this configuration, it is possible to produce a sliding bearing in which an inner circumferential surface has a constant diameter over the entire circumference and outer circumferential surfaces of the both circumferential end portions are chamfered portions extending to the radial inner side as approaching respective ends in the circumferential direction.

Advantageous Effects of Invention

According to the present invention, it is possible to prevent generation of abnormal noise caused by vibration of the outer rotation body or the inner rotation body when a force is periodically applied from the sliding bearing to the outer rotation body or the inner rotation body to widen a gap between the outer rotation body and the inner rotation body.

DESCRIPTION OF EMBODIMENTS

<Structure of Pulley Structure>

Figure 1:
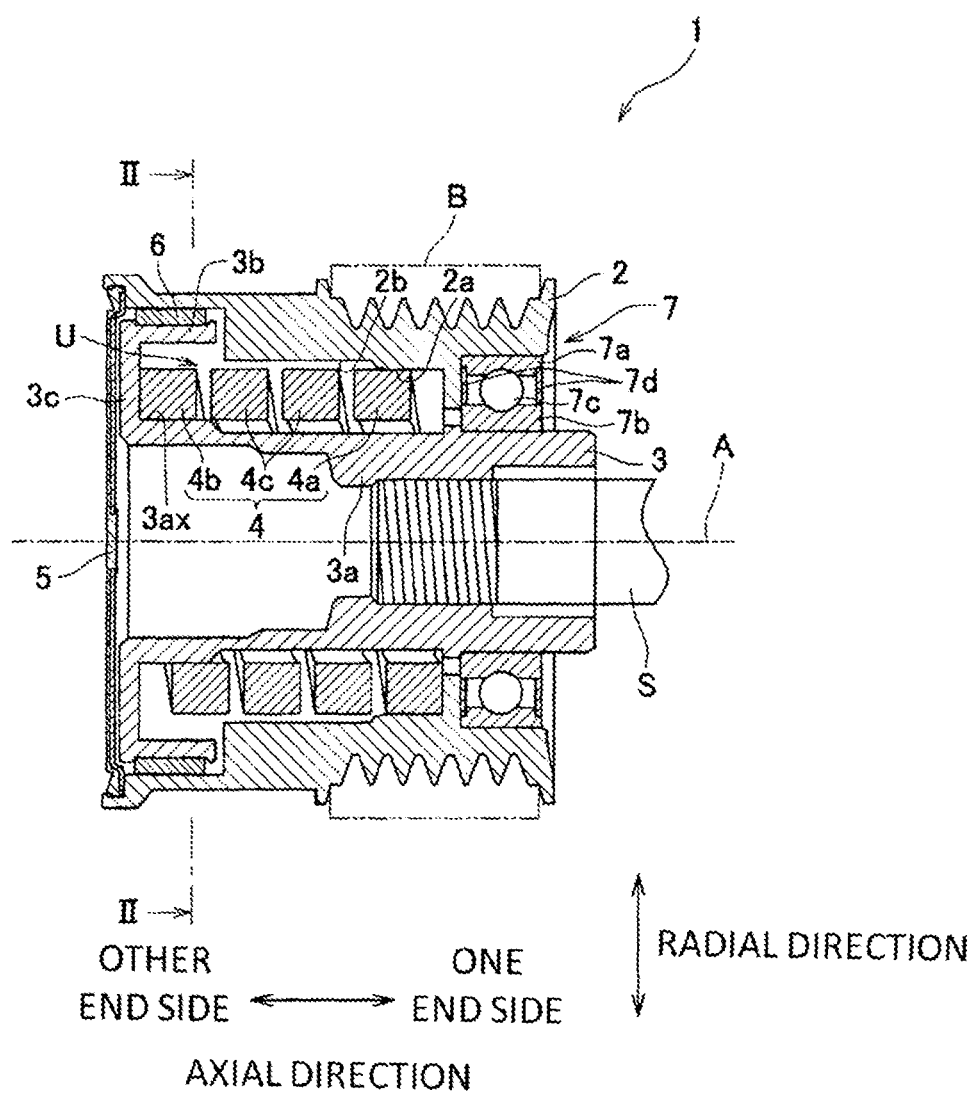
FIG. 1 is a cross-sectional view showing a pulley structure according to an embodiment of the present invention, which is taken along a direction passing through a rotation axis of the pulley structure and parallel to the rotation axis.

A pulley structure 1 according to an embodiment of the present invention is, for example, installed on a drive shaft S of an alternator in an auxiliary drive system of a vehicle, as shown in FIG. 1. The auxiliary drive system includes a drive pulley attached to a crankshaft of an engine, a driven pulley and the pulley structure 1 for driving an auxiliary such as an alternator, and a belt B wound around the pulleys and the pulley structure 1. When the rotation of the crankshaft is transmitted to the driven pulley and the pulley structure 1 via the belt B, the auxiliary unit such as an alternator is driven. As a rotation speed of the crankshaft changes in accordance with the combustion of the engine, the traveling speed of the belt B also changes.

Figure 2:
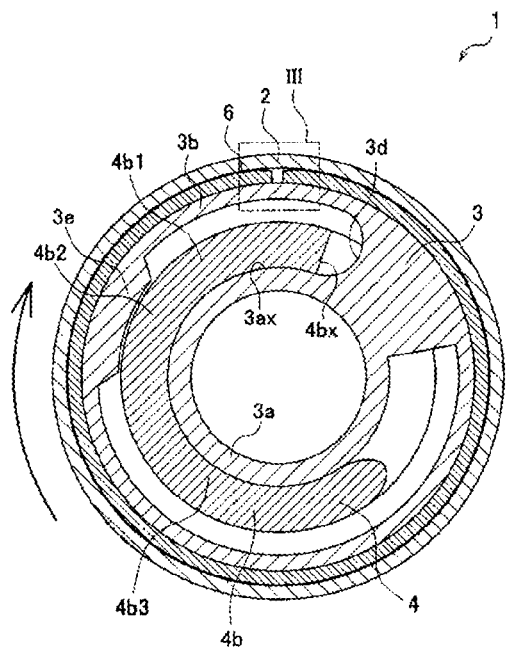
FIG. 2 is a cross-sectional view taken along a line II-II in FIG. 1.
Figure 3:
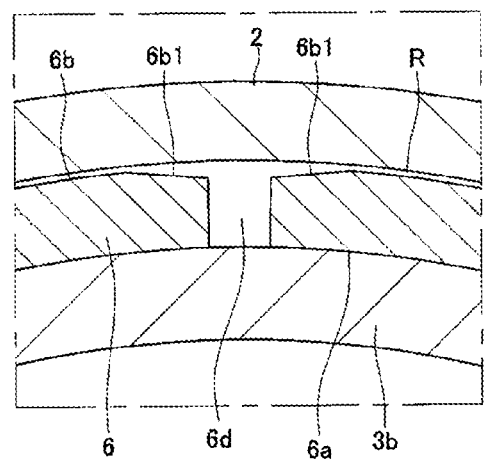
FIG. 3 is an enlarged view of a portion III in FIG. 2.

As shown in FIG. 1 and FIG. 2, the pulley structure 1 includes an outer rotation body 2, an inner rotation body 3, a torsion coil spring 4 (hereinafter, simply referred to as "spring 4"), an end cap 5, and a pair of bearings 6 and 7 including a sliding bearing 6 and a rolling bearing 7.

The outer rotation body 2 and the inner rotation body 3 are both substantially cylindrical, and have the same rotation axis A (the rotation axis of the pulley structure 1, hereinafter simply referred to as "rotation axis A"). The rotation axis A extends along a left-right direction (axial direction) in FIG. 1. In the following, the right side of FIG. 1 is referred to as one end side in the axial direction and the left side of FIG. 1 is referred to as the other end side in the axial direction.

The belt B is wound around an outer circumferential surface of the outer rotation body 2.

The inner rotation body 3 is provided inward of the outer rotation body 2 and is rotatable with respect to the outer rotation body 2. The inner rotation body 3 includes a cylinder body 3a into which the drive shaft S of the alternator is fitted, an outer cylinder portion 3b disposed outside the cylinder body 3a on the other end, and an annular plate portion 3c connecting the other end of the cylinder body 3a and the other end of the outer cylinder portion 3b. The drive shaft S is screwed into a thread groove in an inner circumferential surface of the cylinder body 3a.

The spring 4 is disposed between the outer rotation body 2 and the inner rotation body 3. Specifically, the spring 4 is accommodated in a space U on the other end side with respect to the rolling bearing 7, which is defined by an inner circumferential surface of the outer rotation body 2, an inner circumferential surface of the outer cylinder portion 3b of the inner rotation body 3, an outer circumferential surface of the cylinder body 3a of the inner rotation body 3, and the annular plate portion 3c of the inner rotation body 3. The spring 4 is formed of a wire material having a square cross section (for example, an oil tempered wire for springs (in accordance with JIS G3560:1994)), and is left-handed (counterclockwise from the other end to the one end of the spring 4).

The space U is filled with a lubricant such as grease. The lubricant is charged into the space U in the form of a paste-like lump when assembling the pulley structure 1. The charge amount is, for example, about 0.2 g. When the pulley structure 1 is operated, due to a temperature rise or shear heat generation (friction heat) in the space U, the viscosity of the lubricant decreases, and the lubricant diffuses throughout the space U.

The end cap 5 is disposed at the other end of the outer rotation body 2 and the inner rotation body 3.

The pair of bearings 6 and 7 is interposed between the outer rotation body 2 and the inner rotation body 3 on the other end side and the one end side, respectively. Specifically, the sliding bearing 6 is interposed in a gap (hereinafter referred to as "cylindrical gap") between the inner circumferential surface of the outer rotation body 2 on the other end side and an outer circumferential surface of the outer cylinder portion 3b of the inner rotation body 3. The rolling bearing 7 is interposed between the inner circumferential surface of the outer rotation body 2 on one end side and the outer circumferential surface of the cylinder body 3a of the inner rotation body 3 on one end side. The outer rotation body 2 and the inner rotation body 3 are connected via the pair of bearings 6 and 7 so as to be relatively rotatable. The outer rotation body 2 and the inner rotation body 3 rotate clockwise when viewed from a direction from the other end to the one end (indicated by a bold arrow in FIG. 2, and hereinafter, referred to as "forward direction").

The sliding bearing 6 is a member having an ended ring shape, and there is a gap between both circumferential end portions of the sliding bearing 6. The sliding bearing 6 is made of a hard thermoplastic resin having a Rockwell R scale (in accordance with JIS K7202-2:2001) of 80 to 130. Specifically, the sliding bearing 6 is made of a polyacetal resin, a polyamide resin, a polycarbonate, a modified polyphenylene ether, a polyester (such as polybutylene terephthalate and polyethylene terephthalate), fluororesin, polyphenylene sulfide, polysulfone, amorphous polyarylate, polyetherimide, polyethersulfone, polyetherketones, a liquid crystal polymer, polyamideimide, thermoplastic polyimides, syndio type polystyrene, an olefin resin (such as polyethylene and polypropylene), a styrene resin (such as a ABS resin and polystyrene), polyvinyl chloride, a vinylidene chloride resin, a methacrylic resin, polyvinyl alcohol, a styrene block copolymer resin, and the like. However, from the viewpoint of low friction slidability and wear resistance, it is more preferable that the sliding bearing 6 is made of a polyacetal resin and a polyamide resin among these materials. In addition, it is more preferable that the hardness of the sliding bearing 6 on the Rockwell R scale is about 85 to 125.

The sliding bearing 6 may have a single layer made of one kind of resin composition, or may have two or more layers made of two or more kinds of resin compositions. However, from the viewpoint of production cost, it is more preferable that the sliding bearing 6 has a single layer made of one kind of resin composition.

The sliding bearing 6 is mounted on the outer circumferential surface of the outer cylinder portion 3b of the inner rotation body 3 in a state where a diameter thereof is slightly increased, and an inner circumferential surface 6a of the sliding bearing 6 is in close contact with the outer circumferential surface of the outer cylinder portion 3b by a self-elastic restoring force thereof. The inner circumferential surface 6a of the sliding bearing 6 has a substantially constant diameter over the entire circumference thereof, and the entire circumference of the inner circumferential surface 6a is in close contact with the outer circumferential surface of the outer cylinder portion 3b. Protrusions for preventing the sliding bearing 6 from coming off are provided on both sides of the sliding bearing 6 at the outer circumferential surface of the outer cylinder portion 3b. The sliding bearing 6 can be slightly moved in the axial direction between the protrusions.

There is Aa gap R (sliding gap) of, for example, about 0.1 mm between the outer circumferential surface 6b of the sliding bearing 6 and the inner circumferential surface of the outer rotation body 2. When the lubricant filled in the space U enters the gap R, wear of a friction surface of the sliding bearing 6 (contact surface of the sliding bearing 6 in contact with the outer rotation body 2) is prevented. The lubricant rarely leaks from this gap to the other end side.

In the both circumferential end portions of the sliding bearing 6, the outer circumferential surface 6b of the sliding bearing 6 forms chamfered portions 6b1 extending such that the diameter is smaller toward respective ends. Accordingly, a diameter of the outer circumferential surface 6b at each of the both circumferential end portions of the sliding bearing 6 is smaller than a diameter of the outer circumferential surface 6b at a portion of the sliding bearing 6 other than the both circumferential end portions. Due to this and since the diameter of the inner circumferential surface 6a of the sliding bearing 6 is substantially constant over the entire circumference as described above, the sliding bearing 6 has a thickness (radial width) at each of the both circumferential end portions smaller than a thickness (radial width) at the portion other than the both circumferential end portions. That is, the thickness of the sliding bearing 6 at each of the both circumferential end portions is smaller than the reference dimension of the thickness of the sliding bearing 6. In other words, the sliding bearing 6 includes a main portion having a substantially constant thickness and both end portions each having a thickness smaller than that of the main portion. Further, the sliding bearing 6 does not include a locally thick portion. The reference dimension of the thickness of the sliding bearing 6 refers to a design reference dimension of the thickness of the sliding bearing 6, and is, for example, 2 mm in the case of Examples to be described later.

The rolling bearing 7 is a contact seal type hermetically sealed ball bearing, and includes an outer ring 7a fixed to the inner circumferential surface of the outer rotation body 2, an inner ring 7b fixed to the outer circumferential surface of the cylinder body 3a of the inner rotation body 3, a plurality of balls (rolling elements) 7c rotatably disposed between the outer ring 7a and the inner ring 7b, and annular contact seal members 7d disposed on both axial sides of the plurality of balls 7c. When a lubricant such as grease (for example, a lubricant same as the lubricant filled in the space U) is filled in the rolling bearing 7, wear of a friction surface of the rolling bearing 7 (contact surface of the ball 7c in contact with the outer ring 7a and/or the inner ring 7b) is prevented.

An inner diameter of the outer rotation body 2 is smaller in two steps from the other end to the one end. The inner circumferential surface of the outer rotation body 2 in the smallest inner diameter portion is referred to as a pressure contact surface 2a, and the inner circumferential surface of the outer rotation body 2 in the second smallest inner diameter portion is referred to as an annular surface 2b. The inner diameter of the outer rotation body 2 at the pressure contact surface 2a is smaller than an inner diameter of the outer cylinder portion 3b of the inner rotation body 3. The inner diameter of the outer rotation body 2 at the annular surface 2b is equal to or larger than the inner diameter of the outer cylinder portion 3b of the inner rotation body 3.

An outer diameter of the cylinder body 3a of the inner rotation body 3 is large on the other end side. The outer circumferential surface of the cylinder body 3a of the inner rotation body 3 at this portion is referred to as a contact surface 3ax.

The spring 4 has one end region 4a in contact with the outer rotation body 2 at the one end side, the other end region 4b in contact with the inner rotation body 3 at the other end side, and a middle region 4c between the one end region 4a and the other end region 4b and not in contact with the outer rotation body 2 nor the inner rotation body 3. The one end region 4a and the other end region 4b are regions extending from the one end and the other end of the spring 4 over a half circumference or more (180 degrees or more around the rotation axis), respectively. In addition, in the other end region 4b, the vicinity of a position away from the other end in the circumferential direction of the spring 4 by 90° around the rotation axis is referred to as a second region 4b2, a portion on the other end side with respect to the second region 4b2 is referred to a first region 4b1, and the remaining portion is referred to a third region 4b3 (see FIG. 2).

The spring 4 has a constant diameter over the entire length in a state of not receiving an external force. At this time, an outer diameter of the spring 4 is smaller than the inner diameter of the outer rotation body 2 on the annular surface 2b and larger than the inner diameter of the outer rotation body 2 on the pressure contact surface 2a. The spring 4 is accommodated in the space U in a state where the diameter of the one end region 4a is decreased.

The spring 4 is compressed in the axial direction in the state where no external force is applied to the pulley structure 1 (that is, when the pulley structure 1 is in a stop state). At this time, the outer circumferential surface of the one end region 4a of the spring 4 is pressed against the pressure contact surface 2a by a self-elastic restoring force of the spring 4 in a diameter increasing direction, and the other end region 4b of the spring 4 is in contact with the contact surface 3ax in a state where the diameter thereof is slightly increased. That is, the inner circumferential surface of the other end region 4b of the spring 4 is pressed against the contact surface 3ax by the self-elastic restoring force of the spring 4 in a diameter decreasing direction.

As shown in FIG. 2, an abutment surface 3d facing the other end surface 4bx of the spring 4 is formed at the other end portion of the inner rotation body 3. A protrusion 3e, which protrudes radially inward of the outer cylinder portion 3b and faces the outer circumferential surface of the other end region 4b, is provided in the inner circumferential surface of the outer cylinder portion 3b. The protrusion 3e faces the second region 4b2.

In a state where the inner circumferential surface of the other end region 4b of the spring 4 is in contact with the contact surface 3ax, a gap is formed between the outer circumferential surface of the other end region 4b of the spring 4 and the inner circumferential surface of the outer cylinder portion 3b of the inner rotation body 3. A gap is formed between the annular surface 2b of the outer rotation body 2 and the outer circumferential surface of the spring 4. In the present embodiment, in the state where no external force is applied to the pulley structure 1, the outer circumferential surface of the torsion coil spring 4 and the protrusion 3e are separated from each other and a gap is formed therebetween, as shown in FIG. 2. The outer circumferential surface of the torsion coil spring 4 and the protrusion 3e may be in contact with each other.

<Operation of Pulley Structure>

An operation of the pulley structure 1 is described.

First, a case where the rotation speed of the outer rotation body 2 is higher than the rotation speed of the inner rotation body 3 (i.e., a case where the outer rotation body 2 accelerates) is described.

In this case, the outer rotation body 2 rotates with respect to the inner rotation body 3 in the forward direction (a direction of the arrow in FIG. 2). With the relative rotation of the outer rotation body 2, the one end region 4a of the spring 4 moves together with the pressure contact surface 2a and rotates with respect to the inner rotation body 3. Accordingly, the spring 4 is twisted in the diameter increasing direction. A pressure contact force of the one end region 4a of the spring 4 against the pressure contact surface 2a increases as a torsion angle of the spring 4 in the diameter increasing direction increases. The second region 4b2 is most likely to be subjected to torsion stress, and is separated from the contact surface 3ax when the torsion angle of the spring 4 in the diameter increasing direction increases. At this time, the first region 4b1 and the third region 4b3 are in pressure contact with the contact surface 3ax. The outer circumferential surface of the second region 4b2 abuts against the protrusion 3e at substantially the same time when the second region 4b2 is separated from the contact surface 3ax, or when the torsion angle of the spring 4 in the diameter increasing direction is further increased. When the outer circumferential surface of the second region 4b2 abuts against the protrusion 3e, the deformation of the other end region 4b in the diameter increasing direction is limited, the torsion stress is dispersed in the portion of the spring 4 other than the other end region 4b, and particularly the torsion stress acting on the one end region 4a of the spring 4 increases. Accordingly, a difference in torsion stress acting on respective portions of the spring 4 is reduced, and strain energy can be absorbed by the entire spring 4, so that local fatigue failure of the spring 4 can be prevented.

Further, the pressure contact force of the third region 4b3 against the contact surface 3ax decreases as the torsion angle of the spring 4 in the diameter increasing direction increases. The pressure contact force of the third region 4b3 against the contact surface 3ax is substantially zero at the same time when the second region 4b2 abuts against the protrusion 3e, or when the torsion angle of the spring 4 in the diameter increasing direction is further increased. The torsion angle of the spring 4 in the diameter increasing direction at this time is θ1 (for example, θ1=3°). When the torsion angle of the spring 4 in the diameter increasing direction is larger than θ1, the third region 4b3 is deformed in the diameter increasing direction to move away from the contact surface 3ax. However, the spring 4 does not bend near a boundary between the third region 4b3 and the second region 4b2, and the other end region 4b is maintained in an arc shape. That is, the other end region 4b is maintained in a shape that allows the protrusion 3e to easily slide. Therefore, when the torsion angle of the spring 4 in the diameter increasing direction increases and the torsion stress acting on the other end region 4b increases, the other end region 4b slides in the circumferential direction of the outer rotation body 2 with respect to the protrusion 3e and the contact surface 3ax, against the pressure contact force of the second region 4b2 against the protrusion 3e and the pressure contact force of the first region 4b1 against the contact surface 3ax. Then, the other end surface 4bx presses the abutment surface 3d, so that the torque can be reliably transmitted between the outer rotation body 2 and the inner rotation body 3.

When the torsion angle of the spring 4 in the diameter increasing direction is θ1 or more and less than θ2 (for example, θ2=45°), the third region 4b3 is separated from the contact surface 3ax and is not in contact with the inner circumferential surface of the outer cylinder portion 3b of the inner rotation body 3, and the second region 4b2 is in pressure contact with the protrusion 3e. Therefore, in this case, the effective number of turns of the spring 4 is larger and a spring constant is smaller as compared with a case where the torsion angle of the spring 4 in the diameter increasing direction is less than θ1. When the torsion angle of the spring 4 in the diameter increasing direction reaches θ2, the outer circumferential surface of the middle region 4c of the spring 4 abuts against the annular surface 2b, or the torsion angle of the spring 4 in the diameter increasing direction reaches a limit. Thereby, further deformation of the spring 4 in the diameter increasing direction is limited, and the outer rotation body 2 and the inner rotation body 3 rotate integrally. Accordingly, damage due to the deformation of the spring in the diameter increasing direction can be prevented.

Next, a case where the rotation speed of the outer rotation body 2 is lower than the rotation speed of the inner rotation body 3 (i.e., a case where the outer rotation body 2 decelerates) is described.

In this case, the outer rotation body 2 rotates with respect to the inner rotation body 3 in a reverse direction (a direction opposite to the direction of the arrow in FIG. 2). With the relative rotation of the outer rotation body 2, the one end region 4a of the spring 4 moves together with the pressure contact surface 2a and rotates with respect to the inner rotation body 3. Accordingly, the spring 4 is twisted in the diameter decreasing direction. When the torsion angle of the spring 4 in the diameter decreasing direction is less than θ3 (for example, θ3=10°), the pressure contact force of the one end region 4a against the pressure contact surface 2a slightly decreases as compared with the case where the torsion angle is zero, but the one end region 4a is in pressure contact with the pressure contact surface 2a. Further, the pressure contact force of the other end region 4b against the contact surface 3ax slightly increases as compared with the case where the torsion angle is zero. When the torsion angle of the spring 4 in the diameter decreasing direction is θ3 or more, the pressure contact force of the one end region 4a against the pressure contact surface 2a is substantially zero, and the one end region 4a slides in the circumferential direction of the outer rotation body 2 with respect to the pressure contact surface 2a. Therefore, no torque is transmitted between the outer rotation body 2 and the inner rotation body 3.

In this way, the spring 4 engages with each of the outer rotation body 2 and the inner rotation body 3 to transmit the torque between the outer rotation body 2 and the inner rotation body 3 when the inner rotation body 3 rotates in the forward direction with respect to the outer rotation body 2, whereas slides (slides in the circumferential direction of the outer rotation body 2 in the present embodiment) with respect to at least one of the outer rotation body 2 and the inner rotation body 3 (the pressure contact surface 2a in the present embodiment) and does not transmit the torque between the outer rotation body 2 and the inner rotation body 3 when the inner rotation body 3 rotates in the reverse direction with respect to the outer rotation body 2. In addition, the pulley structure 1 is configured to transmit or block the torque between the outer rotation body 2 and the inner rotation body 3 by increasing or decreasing the diameter of the spring 4.

<Method for Producing Sliding Bearing>

Figure 4:
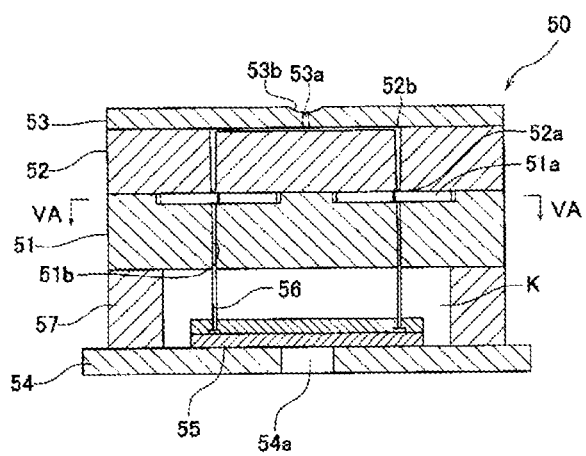
FIG. 4 is a cross-sectional view in a plane passing through centers of two cavities of an injection molding mold for producing a sliding bearing.
Figure 5A:
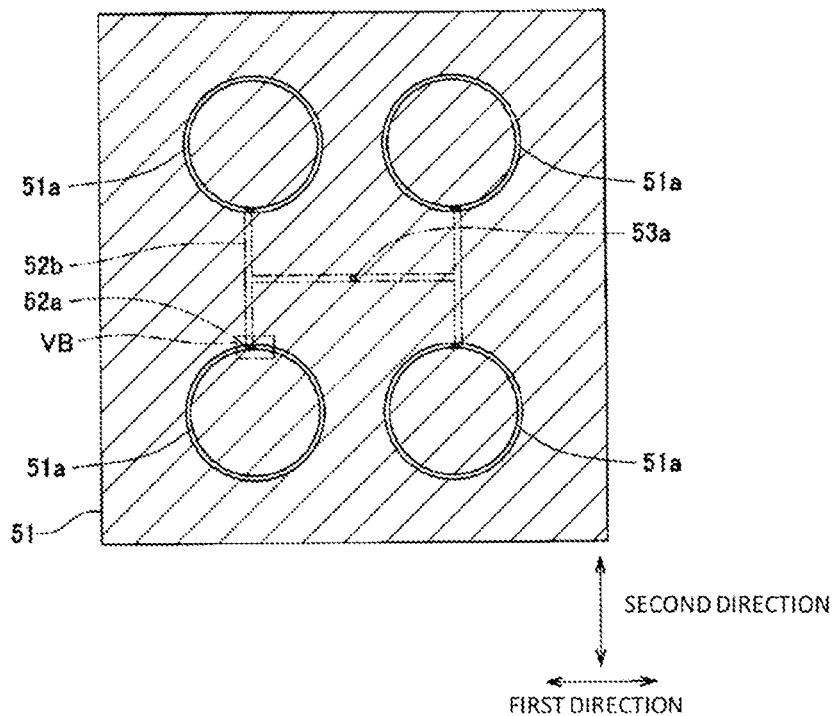
FIG. 5A is a cross-sectional view taken along a line VA-VA in FIG. 4.
Figure 5B:
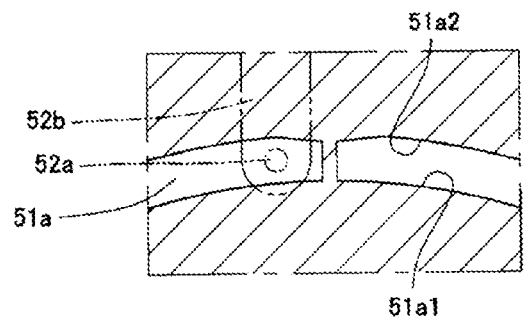
FIG. 5B is an enlarged view of a VB portion in FIG. 5A.

A method for producing the sliding bearing 6 constituting the pulley structure 1 is described. The sliding bearing 6 is produced by an injection molding method using an injection molding machine (not shown) and a mold (injection molding mold) 50, as shown in FIG. 4 to FIG. 5B. The mold 50 is capable of producing the four sliding bearings 6 at once. The mold 50 includes three rectangular parallelepiped mold plates 51 to 53, a support member 54, a protruding plate 55, a plurality of protruding pins 56, and a spacer 57.

Four cavities 51a corresponding to the four sliding bearings 6 are formed in an upper surface of the mold plate 51. Of the four cavities 51a, two are arranged in a first direction (left-right direction in FIG. 5A) and two in a second direction (up-down direction in FIG. 5A), the first direction and the second direction being orthogonal to each other. The cavity 51a is formed into an ended ring shape. An inner wall surface 51a1 on a radial inner side of the cavity 51a has a substantially constant diameter over the entire circumference. In the both circumferential end portions, an inner wall surface 51a2 on a radial outer side of the cavity 51a is gradually smaller in diameter as approaching respective ends in the circumferential direction. Accordingly, in the cavity 51a, a radial width (the length corresponding to the thickness of the sliding bearing 6) is substantially constant at the portion other than the both circumferential end portions. Further, in the cavity 51a, the radial width (the length corresponding to the thickness of the sliding bearing 6) at each of the both circumferential end portions is smaller than the radial width (the length corresponding to the thickness of the sliding bearing 6) at the portion other than the both circumferential end portions. That is, the radial width of the cavity 51a at each of the both circumferential end portions is smaller than the reference dimension of the radial width of the cavity 51a.

A plurality of insertion holes 51b extending in the up-down direction are formed in the mold plate 51 at portions overlapping the respective cavities 51a in the up-down direction. The insertion hole 51b opens to the cavity 51a at an upper end thereof and opens to a lower surface of the mold plate 51 at a lower end thereof. Each protruding pin 56 is inserted from below into each insertion hole 51b.

The mold plate 52 is disposed on an upper surface of the mold plate 51. Four pin gates 52a and runners 52b are formed in the mold plate 52. The pin gate 52a is formed in a lower surface of the mold plate 52 and has a tapered shape in which the diameter is smaller toward a lower side (a mold plate 53 side). The four pin gates 52a correspond to the four cavities 51a, and lower end portions thereof are connected to one end portion of the corresponding cavities 51a in the circumferential direction.

The runner 52b extends from a center portion of the upper surface of the mold plate 52 to both sides in the first direction, and extends to both sides in the second direction at the both end portions in the first direction. Further, the runner 52b extends downward from each tip end portion of the portion extending in the second direction and is connected to an upper end portion of the pin gate 52a.

The mold plate 53 is disposed on an upper surface of the mold plate 52. A sprue 53a is formed in the mold plate 53. The sprue 53a is formed in a center portion of the mold plate 53, penetrates the mold plate 53 in the up-down direction, and is connected, at a lower end thereof, to a center portion of the portion of the runner 52b extending in the first direction. A concave portion 53b is formed in an upper surface of the portion of the mold plate 53 where the sprue 53a is formed. The concave portion 53b is a portion for disposing a nozzle 59 when filling the thermoplastic resin as described later.

The support member 54 is disposed below the mold plate 51. The spacer 57 is interposed between the support member 54 and the mold plate 51, whereby a space K is formed between the support member 54 and the mold plate 51. The protruding plate 55 is accommodated in the space K and is supported by the support member 54. The plurality of protruding pins 56 are fixed to the protruding plate 55. In addition, a through hole 54a is formed in a portion of the support member 54 overlapping a center portion of the protruding plate 55 in the up-down direction.

Figure 6A:
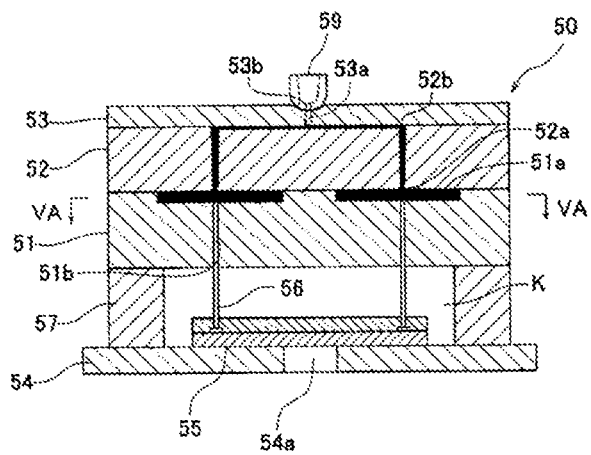
FIG. 6A is a diagram showing a state where the injection molding mold is filled with a synthetic resin material.

In order to prepare the sliding bearing 6 using the mold (injection molding mold) 50, first, as shown in FIG. 6A, the nozzle 59 connected to a plasticizing cylinder (not shown) is disposed on the concave portion 53b, and a thermoplastic resin that has been thermoplasticized (heat-melted) by the plasticizing cylinder is poured from the nozzle 59 into the sprue 53a, to fill the sprue 53a, the runner 52b, the pin gate 52a, and the cavity 51a with the thermoplastic resin. Thereafter, the filled thermoplastic resin is cooled and solidified.

Figure 6B:
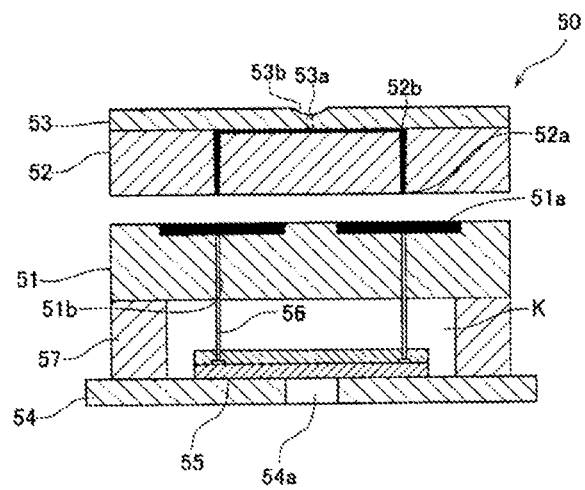
FIG. 6B is a diagram showing a state where a pin gate is separated from the sliding bearing.
Figure 7:
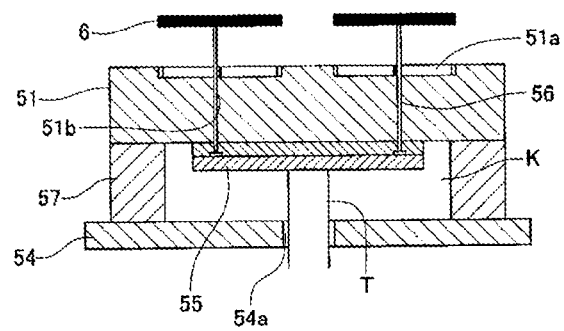
FIG. 7 is a diagram showing a state where the sliding bearing is taken out from the cavity.

Subsequently, as shown in FIG. 6B, the mold plates 52 and 53 are moved upward and separated from the mold plate 51. At this time, since the mold plate 52 has the pin gate 52a, the thermoplastic resin in the pin gate 52a is separated from the thermoplastic resin (sliding bearing 6) in the cavity 51a. Thereafter, as shown in FIG. 7, when the protruding plate 55 is pushed up with a rod T (an ejector mechanism included in the injection molding machine) passing through the through hole 54a, the plurality of protruding pins 56 are pushed up, and the sliding bearing 6 is taken out from the cavity 51a. Thereafter, the sliding bearing 6 is cooled until it does not have molding shrinkage (e.g., reaches room temperature).

<Effects>

As described above, when the resin composition is injection-filled into the cavity 51a having an ended ring shape, a filling pressure (internal pressure) at each of both circumferential end portions (end portions in a resin flow direction) of the cavity 51a is slightly higher than a filling pressure (internal pressure) at a portion of the cavity 51a other than the both circumferential end portions. Therefore, in the prepared the sliding bearing 6, molding shrinkage at the both circumferential end portions is slightly smaller than that at the portion other than the both circumferential end portions. Strictly speaking, the molding shrinkage is smaller toward the end in the circumferential direction. Therefore, unlike the present embodiment, when the radial width of the cavity (the length corresponding to a thickness of the sliding bearing) is constant (the diameters of the wall surfaces on the radial inner side and the radial outer side of the cavity are constant) regardless of the position at the cavity in the circumferential direction, the thickness of each of the both circumferential end portions of the prepared sliding bearing is slightly larger than the thickness of the portion other than the both circumferential end portions.

On the other hand, when the belt B is wound around the outer rotation body 2 of the pulley structure 1, the portion of the outer rotation body 2 to which the force from the belt B is applied is pressed toward the sliding bearing 6. Therefore, in the portion of the outer rotation body 2 to which the force from the belt B is applied, the sliding gap becomes narrow and becomes almost zero. At this time, with respect to the rotation axis A, the sliding gap is widened (for example, about 0.2 mm) in a portion to which the force from the belt B is not applied and which is on the opposite side of the portion of the outer rotation body 2 to which the force from the belt B is applied.

In this case, unlike the present embodiment, when the thickness of each of the both circumferential end portions of the sliding bearing is larger than the thickness of the portion other than the both circumferential end portions, every time (periodically) the both circumferential end portions of the sliding bearing (portions having a larger thickness) reach a position facing the portion of the outer rotation body to which the force from the belt is applied, the sliding bearing applies a force to the outer rotation body to the radial outer side so as to widen the gap between the outer rotation body and the inner rotation body. Accordingly, the outer rotation body may vibrate and abnormal noise may be generated.

In contrast, in the present embodiment, the radial width of the cavity 51a at the portion other than the both circumferential end portions thereof is substantially constant. In addition, the radial width of the cavity 51a at each of the both circumferential end portions is smaller than the radial width of the cavity 51a at the portion other than the both circumferential end portions. Accordingly, as described above, when producing the sliding bearing 6, even when the molding shrinkage at the both circumferential end portions is slightly smaller than that at the portion other than the both circumferential end portions in the sliding bearing 6, the thickness of the produced sliding bearing 6 at each of the both circumferential end portions is smaller than the thickness at the portion other than the both circumferential end portions. Therefore, even when the both circumferential end portions of the sliding bearing 6 reach a position facing the portion of the outer rotation body 2 to which the force from the belt B is applied, the sliding bearing 6 does not apply a force to the outer rotation body 2 to the radial outer side to widen the gap between the outer rotation body 2 and the inner rotation body 3. Accordingly, it is possible to prevent the outer rotation body from vibrating and generating abnormal noise.

In the present embodiment, the diameter of the inner circumferential surface 6a of the sliding bearing 6 is made constant over the entire circumference in the circumferential direction, and the both circumferential end portions of the outer circumferential surface 6b of the sliding bearing 6 are formed with the chamfered portions 6b1 extending to the radial inner side as approaching respective ends in the circumferential direction. Accordingly, the thickness of the sliding bearing 6 at each of the both circumferential end portions is made smaller than the thickness at the portion other than the both circumferential end portions, and contact between the inner circumferential surface 6a of the sliding bearing 6 and the inner rotation body 3 can be improved.

In the case where the chamfered portions 6b1 are not formed in the sliding bearing 6, it is conceivable that ranges may change such as a length range of the both circumferential end portions having a portion with a thickness larger than the thickness of the portion other than the both circumferential end portions (length range along the circumferential direction from a circumferential end surface) and a length range of the chamfered portion 6b1 formed to make the thickness of each of the both circumferential end portions smaller than the thickness of the portion other than the both circumferential end portions (length range along the circumferential direction from a circumferential end surface), according to the material of the sliding bearing (type of the thermoplastic resin), a cross-sectional dimension (thickness and inner diameter at the portion other than the both circumferential end portions), production conditions (injection molding conditions), and the like. Therefore, these length ranges are appropriately set depending on the material and cross-sectional dimension of the above sliding bearing, production conditions, and the like. For example, the length of the chamfered portion 6b1 may be approximately the same as the thickness (reference dimension) of the sliding bearing 6. For example, may be formed within a range of less than 2 mm from the both circumferential end surfaces of the sliding bearing 6.

EXAMPLES

Next, Examples of the present invention is described.

Figure 8A:
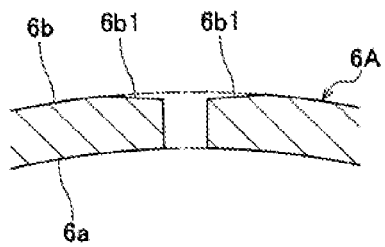
FIG. 8A is a cross-sectional view orthogonal to an axial direction of a circumferential end portion of a sliding bearing according to Example.
Figure 8B:
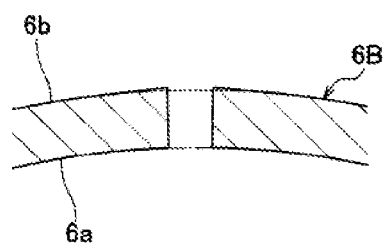
FIG. 8B is a cross-sectional view orthogonal to an axial direction of a circumferential end portion of a sliding bearing according to Comparative Example.
Figure 8C:
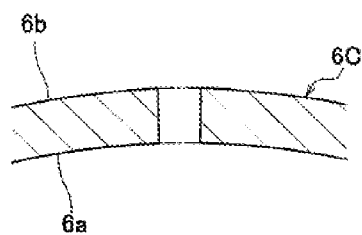
FIG. 8C is a cross-sectional view orthogonal to an axial direction of a circumferential end portion of a sliding bearing according to Reference Example.

In Example, Comparative Example, and Reference Example, pulley structures corresponding to the pulley structure 1 of the present embodiment are formed by using sliding bearings having different shapes. In Example, Comparative Example, and Reference Example, the pulley structures are formed by using sliding bearings 6A to 6C as shown in FIG. 8A to FIG. 8C, respectively.

Table 1 shows the thickness of each portion of the sliding bearings 6A to 6C in Example, Comparative Example, and Reference Example. X=0, 1, and 2 in Table 1 indicate positions 0 mm, 1 mm, and 2 mm from the circumferential end surface of the sliding bearing, respectively. Table 1 shows the thickness of the sliding bearing at these three positions and the maximum value of the thickness at the both circumferential end portions (portions located within 2 mm from the both circumferential end surfaces) of the sliding bearing. In each of Example, Comparative Example, and Reference Example, the reference dimension of the thickness of the sliding bearing is 2.00 mm. The dash-dotted line shown in each of FIG. 8A to FIG. 8C represents a contour line of each sliding bearing according to the reference dimension.

TABLE 1

| | | Example | Comparative Example | Reference Example |
|---|---|---|---|---|
| Thickness (mm) of sliding bearing | X = 0 | 1.74 | 2.04 | 1.98 to 2.01 |
| | X = 1 | 1.86 | 2.03 | 1.98 to 2.01 |
| | X = 2 | 2.00 | 2.00 | 2.00 |
| | Maximum value | 1.99 | 2.04 | 2.01 |

The sliding bearing 6A according to Example corresponds to the sliding bearing 6 of the present embodiment. That is, as shown in FIG. 8A, the sliding bearing 6A has the chamfered portions 6b1 formed on the outer circumferential surface 6b at the both circumferential end portions, and the chamfered portion 6b1 is formed within a range of 2 mm from the both circumferential end surfaces. Therefore, in the sliding bearing 6A, the thickness at each of the both circumferential end portions (portions located within 2 mm from the both circumferential end surfaces) is smaller than the thickness at the portion other than the both circumferential end portions (the thickness gradually is smaller toward respective ends in the circumferential direction).

As shown in FIG. 8B, in the sliding bearing 6B according to Comparative Example, the thickness at each of the both circumferential end portions is larger than the thickness at the portion other than the both circumferential end portions.

As shown in FIG. 8C, the sliding bearing 6C according to Reference Example has a substantially constant thickness over the entire circumference in the circumferential direction. In Table 2, a variation (1.98 to 2.01) in the thickness of the sliding bearing 6C is an error when polishing is performed to be described later.

In the sliding bearings 6A to 6C according to Example, Comparative Example, and Reference Example, the thickness at the portion other than the both circumferential end portions was 2.00 mm. In the sliding bearings 6A to 6C, the inner diameter at the portion other than the both circumferential end portions was 55 mm. The axial lengths of the sliding bearings 6A to 6C were each 6 mm. In Example, Comparative Example, and Reference Example, the cylindrical gap was 2.1 mm and the sliding gap was 0.1 mm before the belt was wound.

In Example, Comparative Example, and Reference Example, the sliding bearing was made of a polyacetal resin having a Rockwell R scale of 114 (trade name "BESTAL-G" (manufactured by Mitsuboshi Belting Ltd)). In Example, Comparative Example, and Reference Example, the sliding bearing was produced using the same mold (injection molding mold) having four cavities as shown in FIG. 5A. However, unlike the mold shown in FIG. 5A, in the mold used in the preparation of these sliding bearings, the radial width of the cavity was an inserting piece at a portion of the mold plate including the both circumferential end portions. In Comparative Example and Reference Example, for the inserting piece, the width of the cavity at each of the both circumferential end portions was the same as that at a portion of the cavity other than the both end portions. In Reference Example, the sliding bearing was prepared using an inserting piece same as that in Comparative Example, and thereafter, polishing was performed such that the thickness was substantially constant over the entire circumference in the circumferential direction. In Example, the sliding bearing was prepared with the inserting piece corresponding to the shape of the chamfered portion.

In order to keep the same conditions other than the shape of the circumferential end portions of the sliding bearing, in Example, Comparative Example, and Reference Example, a pulley structure was formed by using a sliding bearing formed by the same cavity among the above four cavities.

In Example, Comparative Example, and Reference Example, after confirming that the sliding bearing having the thickness of each portion described in Table 1 can be produced with good reproducibility by the injection molding method as described above, pulley structures were formed by using the sliding bearings 6A to 6C having the thicknesses shown in Table 1.

The temperature of the resin during injection molding was about 170° C. at a rear portion of the plasticizing cylinder (a portion opposite to the nozzle), about 200° C. at a front portion of the plasticizing cylinder (a portion on the nozzle side), and about 210° C. at the nozzle portion. The temperature of the mold was about 70° C. The injection pressure of the resin was about 80 MPa, and the injection speed of the resin was about 30 mm/s. The molding shrinkage rate was about 2%.

Figure 9:
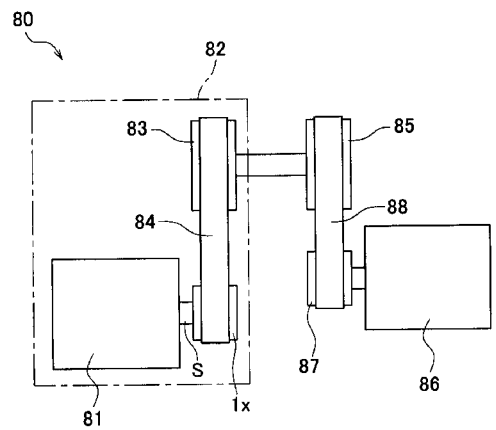
FIG. 9 is a schematic configuration diagram of an idle tester.

Then, an idle tester 80 as shown in FIG. 9 was formed using test pieces (pulley structures) according to Example, Comparative Example, and Reference Example, and the idle tester 80 was operated to evaluate whether abnormal noise was generated. The idle tester 80 includes an alternator 81, a test piece (pulley structure) 1x attached to the drive shaft S of the alternator 81, a crank pulley 83, a V-ribbed belt 84 wound around the crank pulley 83 and the test piece 1x, a timing pulley 85 fixed coaxially with the crank pulley 83, a motor 86, a timing pulley 87 connected to a drive shaft of motor 86, and a timing belt 88 wound around the timing pulleys 85 and 87. A space containing the alternator 81, the test piece 1x, the crank pulley 83, and the V-ribbed belt 84 was used as a constant temperature bath 82, and the ambient temperature was kept constant.

When the above evaluation was performed, in the idle tester 80, the rotation speed of the crank pulley 83 was about 700 rpm, and the rotation speeds of the alternator 81 (auxiliary unit) and the test piece 1x were each about 1500 rpm. The rate of change of these rotation speeds was about 10%. The surface temperature of the alternator 81 (auxiliary unit) and the test piece 1x was set to about 130° C. (the constant temperature tank 82 was kept at 130° C., the same as an idling state of the actual vehicle). In Example, Comparative Example, and Reference Example, the idle tester 80 was operated for about 3 minutes after running-in for about 20 minutes for measurement. The belt tension at this time was about 300 N per belt.

With respect to Example, Comparative Example, and Reference Example, the radial vibration width of the outer rotation body, the vibration acceleration of the alternator 81, and the presence/absence of abnormal noise were was generated. The results are shown in Table 2.

TABLE 2

|  | Example | Comparative Example | Reference Example |
|---|---|---|---|
| Vibration width (mm) of outer rotation body | 0 | 0.05 | 0 to 0.01 |
| Maximum value (m/s$^2$) of vibration acceleration of alternator | 0.25 | 0.6 | 0.27 |
| Presence/absence of abnormal noise | A | C | — |

The radial vibration width of the outer rotation body is a displacement amount of the radial position of the outer rotation body when the both circumferential end portions of the sliding bearing at positions facing a belt-wound portion of the outer rotation body and are at positions rotated by 180° about the rotation axis from the above position. Table 2 shows the measurement results obtained by measurement using a displacement gauge (dial gauge) without operating the idle tester.

The vibration acceleration of the alternator 81 was measured with an acceleration pickup fixed to the outer surface (inward in the radial direction) of the alternator. This is because when the outer rotation body vibrates in the radial direction, the vibration of the outer rotation body propagates to the alternator connected to the pulley structure via an alternator shaft, whereby a housing that covers the alternator body resonates, and this housing acts as a speaker and produces abnormal noise.

In the evaluation of the generation of abnormal noise, 5 evaluators having no hearing impairment determined whether any other abnormal noise could be heard, based on the sound generated in the case of Reference Example. Specifically, when operating the idle tester as described above, the evaluators determined whether abnormal noise could be heard by hearing at a position 2 m behind the alternator (on a side opposite to the pulley structure). When all 5 evaluators could not hear the abnormal noise, the evaluation was rated as "A". When 2 or less (less than half) of the 5 evaluators heard abnormal noise, the evaluation was rated as "B". When 3 or more (more than half) of the 5 evaluators heard abnormal noise, the evaluation was rated as "C". In this evaluation, since Reference Example is used as a reference, the evaluation result is not shown for Reference Example. As can be seen from Table 2, there is no case where the evaluation was rated as "B".

As also can be seen from the results in Table 2, as in the sliding bearing in Example, if the thickness at the portion other than the both circumferential end portions is substantially constant and the thickness at each of the both circumferential end portions is smaller than the thickness at the portion other than the both circumferential end portions, the vibration acceleration of the outer rotation body (alternator) is small, and abnormal noise is less likely to be generated caused by the vibration of the outer rotation body, as compared with a case where, as in the sliding bearing in Comparative Example, each of the both circumferential end portions has a portion with a thickness larger than that at the portion other than the both circumferential end portions.

The radial vibration width of the outer rotation body in Comparative Example is larger than that in Example and Reference Example. Therefore, it can be confirmed that the abnormal noise is likely to be generated when the radial vibration width of the outer rotation body increases. Further, the vibration acceleration of the alternator in Comparative Example is higher than that in Example and Reference Example. Therefore, it can be confirmed that abnormal noise is likely to be generated caused by the resonance of the alternator, as described above.

Although a preferred embodiment of the present invention has been described above, the present invention is not limited to the embodiment described above, and various modifications can be made without departing from the scope of the claims.

Figure 10A:
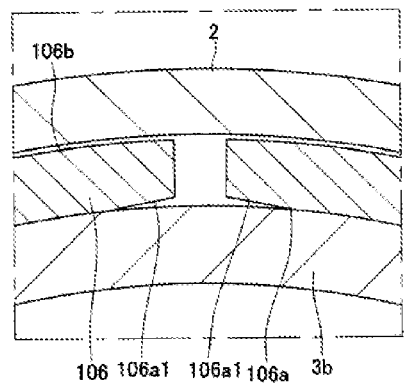
FIG. 10A is a diagram of Modification 1 corresponding to FIG. 3.

The sliding bearing is not limited to one in which the diameter of the inner circumferential surface of the sliding bearing is constant over the entire circumference and the chamfered portions are formed on the outer circumferential surfaces at the both circumferential end portions. In Modification 1, as shown in FIG. 10A, both circumferential end portions on inner circumferential surfaces 106a of a sliding bearing 106 are chamfered portions 106a1 whose diameter is larger toward respective ends. The diameter of an outer circumferential surface 106b of the sliding bearing 106 is substantially constant.

Figure 10B:
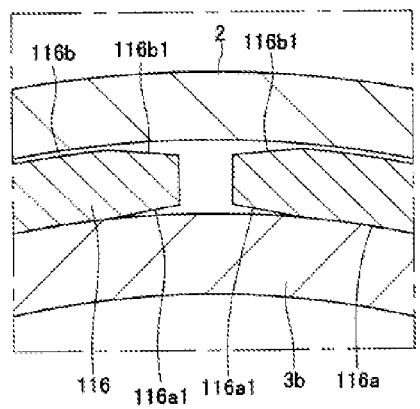
FIG. 10B is a diagram of Modification 2 corresponding to FIG. 3.

In Modification 2, as shown in FIG. 10B, both circumferential end portions on inner circumferential surfaces 116a of a sliding bearing 116 are chamfered portions 116a1 whose diameter is larger toward respective ends. The both circumferential end portions on outer circumferential surfaces 116b of the sliding bearing 116 are chamfered portions 116b1 whose diameter is larger toward respective ends.

Even in Modifications 1 and 2, the sliding bearing has a substantially constant thickness in a portion other than the both circumferential end portions, and the thickness at each of the both circumferential end portions is smaller than the thickness at the portion other the both circumferential end portions.

The sliding bearing is not limited to being in close contact with the inner rotation body in a state where the diameter is increased. The sliding bearing may be in close contact with the outer rotation body in a state where the diameter is decreased. In this case, as in Modification 1 described above, if both circumferential end portions on inner circumferential surfaces of the sliding bearing are chamfered portions whose diameter is larger toward respective ends, and the diameter of the outer circumferential surface is substantially constant, the contact between the sliding bearing and the outer rotation body can be improved. However, even in this case, the chamfered portions may be formed on the outer circumferential surfaces on the both circumferential end portions of the sliding bearing, as in the above embodiment. Similarly to Modification 2, the chamfered portions may be formed on both the outer circumferential surface and the inner circumferential surface on the both circumferential end portions of the sliding bearing.

It is not limited to that there is a gap between the both circumferential end portions of the sliding bearing. Both axial end portions of the sliding bearing may be in contact with each other, and there may be almost no gap between the both circumferential end portions of the sliding bearing.

In the pulley structure, a clutch having a configuration different from a coil spring type clutch including the torsion coil spring may be configured to transmit or block the torque between the outer rotation body and the inner rotation body. Further, the pulley structure may not have a clutch that transmits or blocks the torque between the outer rotation body and the inner rotation body. That is, in the pulley structure, the torque may be always transmitted between the outer rotation body and the inner rotation body, or the torque may be always blocked between the outer rotation body and the inner rotation body.

Although the present invention has been described in detail with reference to a specific embodiment, it is obvious to those skilled in the art that various changes and modifications may be made without departing from the gist and the scope of the invention.

This application is based on Japanese Patent Application 2018-119639 filed on Jun. 25, 2018, and Japanese Patent Application 2019-111677 filed on Jun. 17, 2019, contents of which are incorporated by reference herein.

REFERENCE SIGNS LIST

1 Pulley structure
2 Outer rotation body
3 Inner rotation body
6a Inner circumferential surface
6b Outer circumferential surface
6b1 Chamfered portion
6 Sliding bearing
7 Rolling bearing
50 Injection molding machine
51 Mold plate
51a Cavity
B Belt

The invention claimed is:

1. A pulley structure comprising:
a cylindrical outer rotation body around which a belt is to be wound and which is rotated around a rotation axis by a torque applied from the belt;
an inner rotation body which is provided radially inward of the outer rotation body, and is relatively rotatable with respect to the outer rotation body around the rotation axis; and
a pair of bearings which is disposed between the outer rotation body and the inner rotation body at each of one end side and the other end side in an axial direction along the rotation axis, and connects the outer rotation body and the inner rotation body to make the rotation bodies rotatable with respect to each other,
wherein, of the pair of bearings, one bearing is a sliding bearing, and the other bearing is a rolling bearing,
wherein the sliding bearing is made of a thermoplastic resin and is formed into an ended ring shape, and
wherein a thickness of the sliding bearing at each of both circumferential end portions is smaller than a reference dimension of a thickness of the sliding bearing.

2. The pulley structure according to claim 1,
wherein an inner circumferential surface of the sliding bearing is in contact with the inner rotation body in a state where a diameter of the sliding bearing is increased so that the sliding bearing is in close contact with the inner rotation body due to a self-elastic restoring force of the sliding bearing in a diameter decreasing direction,
wherein a diameter of the inner circumferential surface of the sliding bearing is constant over an entire circumference in a circumferential direction, and
wherein outer circumferential surfaces of the both circumferential end portions of the sliding bearing form chamfered portions extending to a radial inner side as approaching respective ends in the circumferential direction.

3. A sliding bearing constituting a pulley structure, the pulley structure comprising:
a cylindrical outer rotation body around which a belt is to be wound and which is rotated around a rotation axis by a torque applied from the belt;
an inner rotation body which is provided radially inward of the outer rotation body, and is relatively rotatable with respect to the outer rotation body around the rotation axis; and
a pair of bearings which is disposed between the outer rotation body and the inner rotation body at each of one end side and the other end side in an axial direction along the rotation axis, and connects the outer rotation body and the inner rotation body to make the rotation bodies rotatable with respect to each other, in which, of the pair of bearings, one bearing is the sliding bearing, and the other bearing is a rolling bearing,
wherein the sliding bearing is made of a thermoplastic resin,
wherein the sliding bearing is formed into an ended ring shape, and
wherein a thickness at each of both circumferential end portions of the sliding bearing is smaller than a reference dimension of a thickness of the sliding bearing.

4. The sliding bearing according to claim 3, in which an inner circumferential surface of the sliding bearing is in contact with the inner rotation body in a state where a diameter of the sliding bearing is increased so that the sliding bearing is in close contact with the inner rotation body due to a self-elastic restoring force of the sliding bearing in a diameter decreasing direction,
wherein a diameter of the inner circumferential surface is constant over an entire circumference in a circumferential direction, and
wherein outer circumferential surfaces of the both circumferential end portions form chamfered portions extending to a radial inner side as approaching respective ends in the circumferential direction.

5. A method for producing a sliding bearing constituting a pulley structure, the pulley structure comprising: a cylindrical outer rotation body around which a belt is to be wound and which is rotated around a rotation axis by a torque applied from the belt;
an inner rotation body which is provided radially inward of the outer rotation body, and is relatively rotatable with respect to the outer rotation body around the rotation axis; and
a pair of bearings which is disposed between the outer rotation body and the inner rotation body at each of one end side and the other end side in an axial direction along the rotation axis, and connects the outer rotation body and the inner rotation body to make the rotation bodies rotatable with respect to each other, in which, of the pair of bearings, one bearing is the sliding bearing having an ended ring shape, and the other bearing is a rolling bearing,
the method comprising injection-molding a thermoplastic resin by using a mold having a cavity with an ended ring shape, to prepare the sliding bearing,
wherein a radial width of the cavity at each of both circumferential end portions is smaller than a reference dimension of a radial width of the cavity.

6. The method for producing a sliding bearing according to claim 5, in which an inner circumferential surface of the sliding bearing is in contact with the inner rotation body in a state where a diameter of the sliding bearing is increased so that the sliding bearing is in close contact with the inner rotation body due to a self-elastic restoring force of the sliding bearing in a diameter decreasing direction, wherein a diameter of a wall surface on a radial inner side of the cavity is constant over an entire circumference in the circumferential direction, and wherein in the both circumferential end portions of the cavity, wall surfaces on a radial outer side of the cavity extend to the radial inner side as approaching respective ends in the circumferential direction.

\* \* \* \* \*